US011405686B2

(12) United States Patent
Khan et al.

(10) Patent No.: US 11,405,686 B2
(45) Date of Patent: Aug. 2, 2022

(54) ASYNCHRONOUS VIDEO TRANSCODING

(71) Applicant: Microsoft Technology Licensing, LLC, Redmond, WA (US)

(72) Inventors: Yasir Khan, Thousand Oaks, CA (US); Peter Zhang, New York, NY (US); Long Peng, Scarsdale, NY (US); Shane Afsar, Long Island City, NY (US); Si Lao, Sunnyvale, CA (US); Alice Ren, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/774,273

(22) Filed: Jan. 28, 2020

(65) Prior Publication Data

US 2021/0235158 A1 Jul. 29, 2021

(51) Int. Cl.
*H04N 21/2343* (2011.01)
*H04N 21/4788* (2011.01)
*H04N 21/4402* (2011.01)
*H04N 21/239* (2011.01)
*H04N 21/2743* (2011.01)
*H04N 21/4627* (2011.01)
*H04N 21/643* (2011.01)
*H04N 21/854* (2011.01)

(52) U.S. Cl.
CPC . *H04N 21/440218* (2013.01); *H04N 21/2393* (2013.01); *H04N 21/2743* (2013.01); *H04N 21/4627* (2013.01); *H04N 21/643* (2013.01); *H04N 21/854* (2013.01)

(58) Field of Classification Search
CPC ....... H04N 21/2743; H04N 21/440218; H04N 21/2393
See application file for complete search history.

(56) References Cited

U.S. PATENT DOCUMENTS 9,729,918 B2 * 8/2017 Wang ............. H04N 21/440218
10,271,079 B1 * 4/2019 Woschank ......... H04N 21/4788
2018/0310032 A1 * 10/2018 Reitmeyer ..... H04N 21/440218

OTHER PUBLICATIONS

"AV Asset Resource Loader Delegate", Retrieved from https://developer.apple.com/documentation/avfoundation/avassetresourceloaderdelegate, Retrieved on Sep. 13, 2019, 2 Pages.

* cited by examiner

Primary Examiner — Hsiungfei Peng
(74) Attorney, Agent, or Firm — Schwegman Lundberg & Woessner, P.A.

(57) ABSTRACT

Techniques for efficiently processing and publishing video via an online service are disclosed herein. In some embodiments, a computer system receives an original version of a video from a first computing device of a first user of an online service, determines that a converted version of the video is not available at a first point in time, publishes the original version of the video on the online service based on the request to post the video and on the determining that the converted version of the video is not available, determines that the converted version of the video is available at a second point in time subsequent to the first point in time, and publishes the converted version of the video on the online service based on the determining that the converted version of the video is available.

20 Claims, 8 Drawing Sheets

US 11,405,686 B2

ASYNCHRONOUS VIDEO TRANSCODING

TECHNICAL FIELD

The present application relates generally to systems and methods, and computer program products for asynchronous video transcoding and other video processing for an online service.

BACKGROUND

Video sharing, such as by a user of an online service uploading a video to be made available for access and playback by other users of the online service, suffers from technical problems. Playback performance for streaming videos that have been uploaded by users of an online service have two important metrics: latency, which is the delay before the playing of a video following an instruction for it to be played (e.g., the time to the first frame), and optimality, which is the ideal resolution of the video for the available network over which it is being played. Since video sharing often involves several stages of processing before the video is able to be viewed by other users, current video sharing solutions suffer from latency issues. Certain processing operations, such as transcoding, can take up to the length of the original version of the video to complete. Reducing latency while maintaining optimality is difficult. As a result, the functioning of the online service that serves the videos to the other users and the functioning of the computing devices on which the videos are accessed and viewed by the other users are negatively affected. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

I. Overview

Example methods and systems of asynchronous video transcoding and other video processing for an online service are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. The implementation of the features disclosed herein involves a non-generic, unconventional, and non-routine operation or combination of operations. In some example embodiments, a specially-configured computer system initially publishes an original version of a video uploaded by a user in a particular video file format, such as MP4, while waiting for the original version to be converted into a converted version having a different video file format, such as HyperText Transfer Protocol Live Streaming (HLS), thereby enabling other users to access and view the video immediately. When the conversion of the original version of the video into the converted version is complete and the converted version is available, then specially-configured computer system may then publish the converted version of the video in place of the original version, thereby improving the quality of the video being served to the other users.

By applying one or more of the solutions disclosed herein, the computer system reduces latency and improves optimality in video sharing, as well as providing other technical effects. As a result, the functioning of the computer system of the online service that serves the videos and the functioning of the computing devices interacting with the computer system of the online service to access and view the videos are improved. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Figure 1:
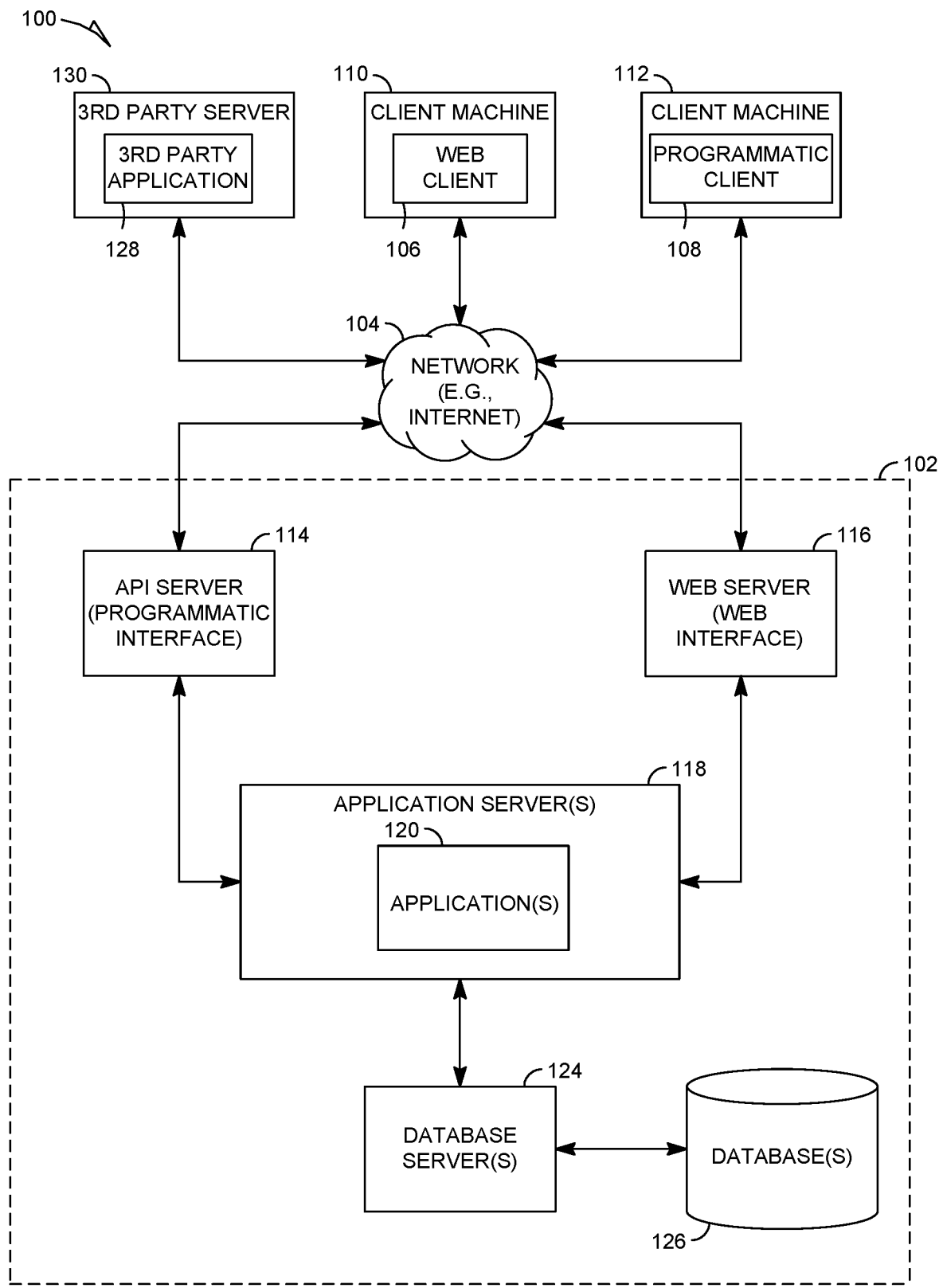
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third-party. The third-party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
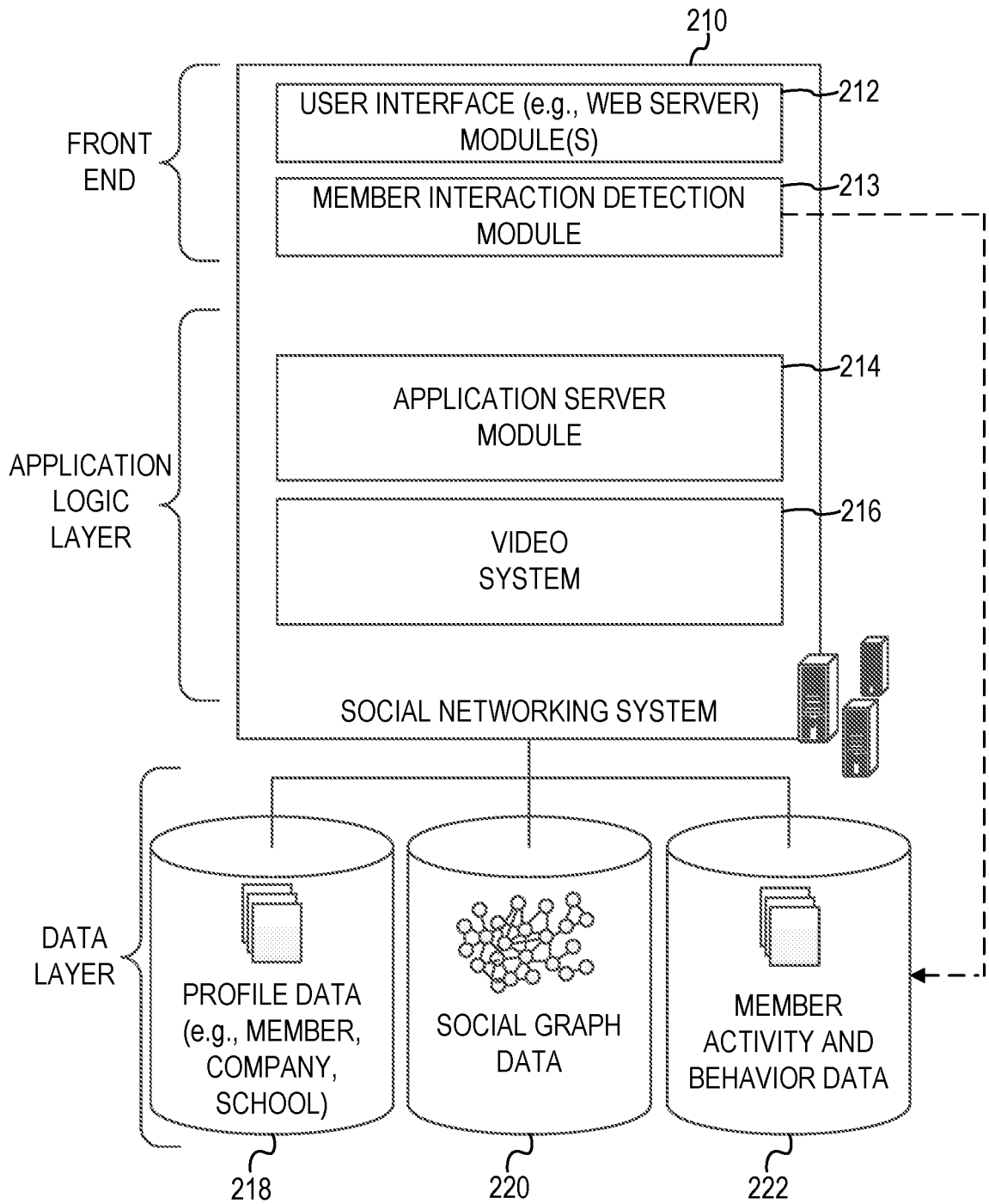
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a video system 216, for use in social networking system 210, consistent with some embodiments of the present disclosure. In some embodiments, the video system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the video system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the video system 216. The members' interactions and behavior may also be tracked, stored, and used by the video system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third-party applications and services.

Although the video system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
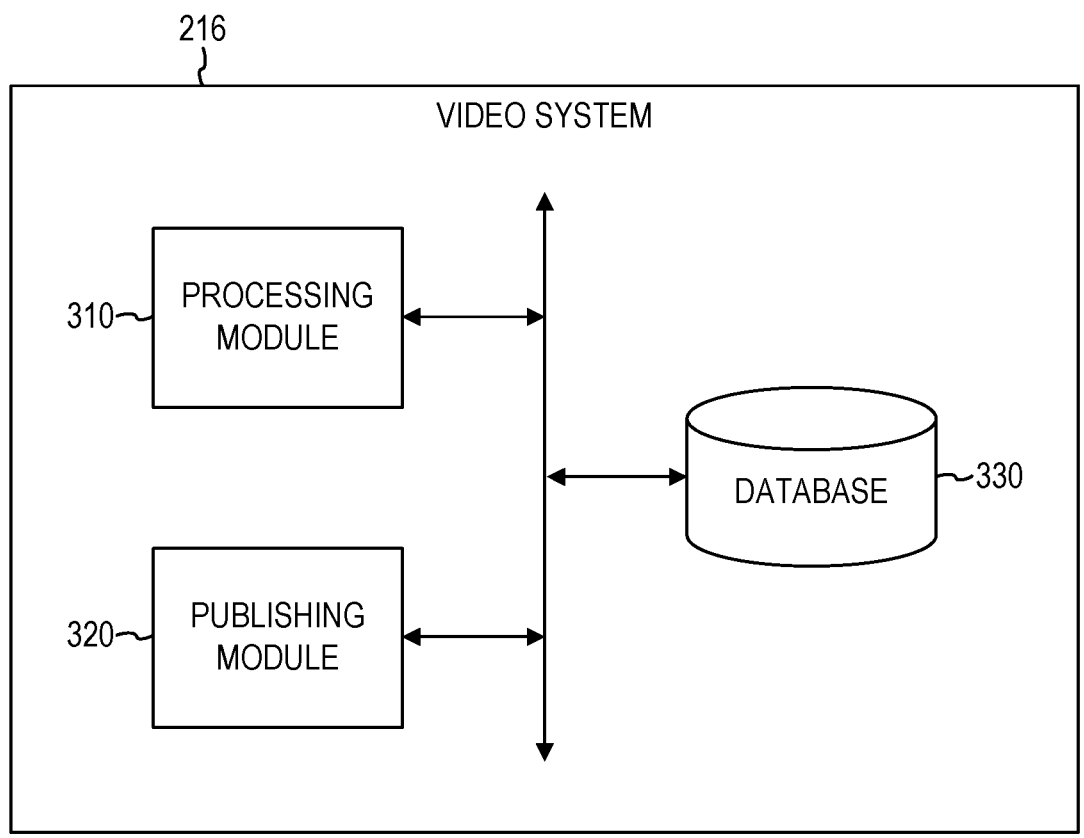
FIG. 3 is a block diagram illustrating components of a video system, in accordance with an example embodiment.

FIG. 3 is a block diagram illustrating components of a video system 216, in accordance with an example embodiment. In some embodiments, the video system 216 comprises any combination of one or more of a processing module 310, a publishing module 320, and one or more database(s) 330. The processing module 310, the publishing module 320, and the database(s) 330 can reside on a computer system, or other machine, having a memory and at least one processor (not shown). In some embodiments, the processing module 310, the publishing module 320, and the database(s) 330 can be incorporated into the application server(s) 118 in FIG. 1. In some example embodiments, the database(s) 330 is incorporated into database(s) 126 in FIG. 1 and can include any combination of one or more of databases 218, 220, and 222 in FIG. 2. However, it is contemplated that other configurations of the processing module 310, the publishing module 320, and the database(s) 330, are also within the scope of the present disclosure.

In some example embodiments, one or more of the processing module 310 and the publishing module 320 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the processing module 310 and the publishing module 320 is configured to receive user input. For example, one or more of the processing module 310 and the publishing module 320 can present one or more GUI elements (e.g., drop-down menu, selectable buttons, text field) with which a user can submit input.

In some example embodiments, one or more of the processing module 310 and the publishing module 320 is configured to perform various communication functions to facilitate the functionality described herein, such as by communicating with the social networking system 210 via the network 104 using a wired or wireless connection. Any combination of one or more of the processing module 310 and the publishing module 320 may also provide various web services or functions, such as retrieving information from the third party servers 130 and the social networking system 210. Information retrieved by the any of the processing module 310 and the publishing module 320 may include profile data corresponding to users and members of the social networking service of the social networking system 210.

Additionally, any combination of one or more of the processing module 310 and the publishing module 320 can provide various data functionality, such as exchanging information with database(s) 330 or servers. For example, any of the processing module 310 and the publishing module 320 can access member profiles that include profile data from the database(s) 330, as well as extract attributes and/or characteristics from the profile data of member profiles. Furthermore, the one or more of the processing module 310 and the publishing module 320 can access social graph data and member activity and behavior data from database(s) 330, as well as exchange information with third party servers 130, client machines 110, 112, and other sources of information.

In some example embodiments, the processing module 310 is configured to receive an original version of a video from a first computing device of a first user of an online service. The original version of the video may be received in association with a request to post the video for access by other users of the online service. For example, the first user may select one or more user interface elements on his or her mobile device via a mobile application of the online service in order to select the video (e.g., from a library of videos on the mobile device) and to trigger the upload of the selected video to the video system 216 for sharing with the other users.

In some example embodiments, the processing module 310 is configured to convert the original version of the video into a converted version of the video. The original version of the video may comprise a first video file format, and the converted version of the video may comprise a second video file format that is generated based on a conversion of the video in the first video file format to the video in the second video file format, such as by transcoding. A video file format is a type of file format for storing digital video data on a computer system. A video file normally consists of a container containing video data in a video coding format alongside audio data in an audio coding format. The container can also contain synchronization information, subtitles, and metadata such as title. Transcoding is the process of converting a media file or object from one format to another and comprises a direct digital-to-digital conversion of one encoding to another encoding. As a result of the transcoding, the video is converted from one form of coded representation (e.g., the first video file format) to another (e.g., the second video file format).

In some example embodiments, the processing module 310 is configured to convert the video from a first video file format of MP4 to a second video file format of HLS. However, other video file formats are also within the scope of the present disclosure. As will be discussed in further detail below, converting the video into HLS format and then serving the video in HLS format to other users of the online service provides a technical benefit of decreasing latency and improving the optimality or quality of the video during playback by the other users. The use of HLS, as discussed herein, is particularly helpful in embodiments that employ prefetching, as will be discussed in further detail below.

HLS is an HTTP-based adaptive bitrate streaming communications protocol. HLS works by breaking the overall video stream into a sequence of small HTTP-based file downloads, with each download loading one short chunk of an overall potentially unbounded transport stream. A list of available streams, encoded at different bit rates, is sent to the client using an extended M3U playlist. M3U (MP3 URL or Moving Picture Experts Group Audio Layer 3 Uniform Resource Locator in full) is a computer file format for a multimedia playlist. One common use of the M3U file format is creating a single-entry playlist file pointing to a stream on the Internet. The created file provides easy access to that stream and may be used to point media players to audio and video sources, including online sources.

In some example embodiments, the conversion of the video from the first video file format of the original version of the video to the second video file format of the converted version of the video is not performed or completed immediately. Rather, there may be latency in the conversion process. As a result of this latency, the converted version of the video may not be initially available for online publishing immediately following the upload of the original version of the video by the first user. For example, a high volume in videos that have been uploaded by users for online publishing may result in a backlog in the conversion of those videos. Additionally, the duration of the videos may also add to the backlog and delay in conversion. Furthermore, in situations where conversion operations are performed sporadically or otherwise not performed continuously, the original version of the video may be received during a downtime period for the conversion process.

At a certain point after the original version of the video is uploaded by the first computing device of the first user and received by the video system 216, the publishing module 320 attempts to publish the video. However, since the converted version of the video might not be available yet (e.g., the video may not yet be converted from the first video file format into the second video file format), the publishing module 320 may base the publishing of the video on whether or not the converted version is available.

In some example embodiments, the publishing module 320 is configured to determine, after the original version of the video has been received by the video system 216, whether a converted version of the video is available. The publishing module 320 can make this determination based on information stored in the database(s) 330. For example, the database(s) 330 may store an indication of whether or not the converted version of the video is available or some other indication of which version(s) of the video are available in association with a record of the video, and the publishing module 320 may access the indication(s) stored in the database(s) 330 in order to make the determination of whether the converted version of the video is available.

In some example embodiments, the publishing module 320 is configured to publish the original version of the video on the online service in response to, or otherwise based on, the first user's request to post the video and a determination that the converted version of the video is not available. The publishing of the original version of the video may be configured to enable other computing devices different from the first computing device to access and view the original version of the video via the online service. For example, the publishing of the original version of the video may be configured to enable the other computing devices to prefetch and play the original version of the video via the online service.

In some example embodiments, the publishing of the original version of the video is configured to restrict access to the original version of the video to only a particular subset of users of the online service. For example, access to the original version of the video may be restricted to only users that have a minimum threshold degree connection (e.g., a first degree connection) with the first user. A user's social network is made up of different degrees of connections with other users, such as first degree connections, second degree connections, third degree connections, and so on and so forth. A first degree connection between the first user and a second user is a direct connection between the first user and the second user, in which either one of the first user and the second user accepts an invitation to connect from the other one of the first user and the second user. A second degree connection between the first user and the second user is an indirect connection between the first user and the second user, in which the first user is directly connected to a third user that is directly connected to the second user. Other degree connections (e.g., third degree connection, fourth degree connection, etc.) follow this pattern of introducing other directly-connected users in the indirect connection between the first user and the second user.

Other types of restrictions on access to the original version of the video are also within the scope of the present disclosure. For example, the publishing of the original version of the video may be conditioned upon one or more other determinations as well. For example, in some example embodiments, the publishing module 320 is configured to determine whether or not a duration of the original version of the video satisfies a minimum duration threshold value (e.g., whether the duration of the original version of the video is equal to or greater than 5 seconds), and the publishing module 320 conditions the publishing of the original version of the video on a determination that the duration of the original version of the video satisfies the minimum duration threshold value. In another example, the publishing module 320 is configured to determine whether or not the original version of the video has a virus using a virus detection algorithm, and the publishing module 320 conditions the publishing of the original version of the video on a determination that the original version of the video does not have a virus.

In some example embodiments, the publishing module 320 is configured to publish the converted version of the video on the online service in response to, or otherwise based on, a determination that the converted version of the video is available. The publishing of the converted version of the video may be configured to enable the other computing devices to access and view the converted version of the video via the online service. For example, the publishing of the converted version of the video may be configured to enable the other computing devices to prefetch and play the converted version of the video via the online service. In some example embodiments, the publishing of the converted version of the video replaces the original version of the video from access by the other computing devices of the other users with the converted version of the video, such that the original version of the video is no longer accessible to the other computing devices.

In some example embodiments, the publishing module 320 is configured to publish the original version of the video and the converted version of the video in the form of streaming video. Playback performance for streaming video is important in the context of a feed, such as a user's personalized online data feed (e.g., an activity stream or content stream), where the user scrolling through feed updates expects video included in the feed to play immediately. A slow loading video with a loading indicator will make the user lose interest, scroll over the video, and not engage.

One of the ways to decrease start-up time for a video is to prefetch initial segments of a video stream and store them locally on the client device (e.g., on the mobile device of the user). Prefetching is a technique for speeding up fetch operations by beginning a fetch operation whose result is expected to be needed soon. In the case of presenting video on a mobile device, segments of the video may be prefetched prior to the video entering the viewport of the client device on which the video is to be rendered and played. A viewport is a polygon viewing region in computer graphics. The viewport is an area (e.g., a rectangular area) expressed in rendering-device-specific coordinates (e.g. pixels for screen coordinates) in which the objects of interest (e.g., videos) are going to be rendered. Without prefetching and caching of the video, every time the video cell enters the viewport, the client device fetches the video from the server for playback. Other than providing a slow start-up time, this lack of prefetching and caching also results in using more network data if the user scrolls the video out of the viewport and brings it back into view, as the same video is re-fetched on repeated playback.

Figure 4:
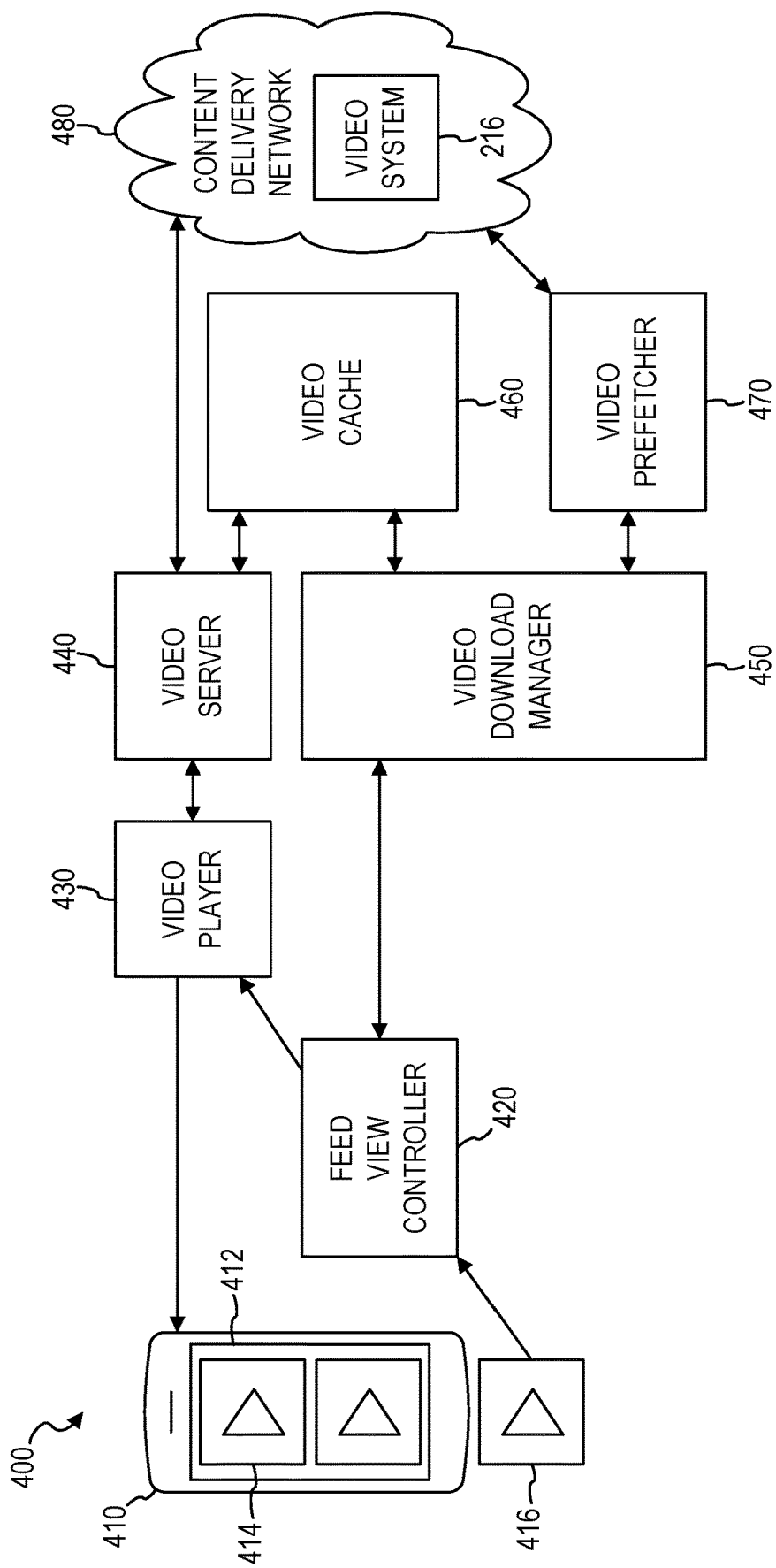
FIG. 4 illustrates an architecture in which the video system may be implemented, in accordance with an example embodiment.

In some example embodiments, an architecture is provided to reduce latency while maintaining the most optimal experience for the user by using prefetching and caching HLS segments on a mobile device. FIG. 4 illustrates an architecture 400 in which the video system 216 may be implemented, in accordance with an example embodiment. In the architecture 400, a mobile device 410 of a user displays data of an online service, such as a feed of the user. This data may include videos whose representations 414 are within the viewport 412 of the mobile device 410, as well as videos whose representations 416 have not yet entered the viewport of the mobile device 410. The video representations 416 may be moved from outside of the viewport 412 to within the viewport 412 via manipulation of the page being displayed on the mobile device 410, such as by the user using one or more user interface elements to scroll the page up or down.

In some example embodiments, the mobile device 410 comprises multiple components that work together to fetch video content from the video system 216 for playback within a mobile application on the mobile device 410. For example, the mobile device 410 may comprise a feed view controller 420, a video player 430, a video server 440, a video download manager 450, a video cache 460, and a video prefetcher 470. The mobile device 410 may fetch the video content from the video system 216 via a content delivery network (CDN) 480 to which the video system 216 belongs. The CDN 480 is a system of distributed servers that deliver pages and other web content to a user, based on the geographic locations of the user, the origin of the webpage, and the content delivery server. The CDN may comprise a plurality of proxy servers geographically positioned between an origin server of some web content (e.g., the video system 216) and the client device requesting the content (e.g., the mobile device 410) with the purpose of delivering the content faster by reducing latency. These geographically closer servers, also called Points of Presence, may cache the cacheable content, thereby removing a lot of the load from the origin server. In some example embodiments, the publishing of a version of the video (e.g., the original version, the converted version) by the publishing module 320 comprises the publishing module 320 transmitting the version of the video to the closer proxy servers of the CDN 480, from where it may be accessed and fetched by the mobile device 410.

In some example embodiments, the video download manager 450 acts as an entry point for initiating downloads by the mobile device 410. As feed updates are received from the CDN 480, the feed view controller 420 asks the video download manager 450 to download videos corresponding to the feed updates. In some example embodiments, the video download manager 450 downloads HLS segments via the video prefetcher 470. The video download manager 450 may re-download a segment that has already been downloaded, in case the network conditions have improved and a higher bit-rate is available. In some example embodiments, the video download manager 450 maintains a list of downloads through the video cache 460. If the mobile application on the mobile device 410 is backgrounded while segments are being downloaded, the video download manager 450 can make sure that the current downloads continue to work in the background.

In some example embodiments, the downloads are removed based on a cache replacement policy. A cache replacement policy comprises optimizing instructions, or algorithms, that a computer program or a hardware-maintained structure can utilize in order to manage a cache of information stored on the computer. Caching improves performance by keeping recent or often-used data items in memory locations that are faster or computationally cheaper to access than normal memory stores. When the cache is full, the algorithm must choose which items to discard to make room for the new ones. In some example embodiments, the video download manager 450 uses a least recently used (LRU) eviction policy that discards the least recently used items first. This algorithm involves keeping track of what was used when, such as by keeping age bits for cache-lines and tracking the least recently used cache-line based on the age-bits. In such an implementation, every time a cache-line is used, the age of all other cache-lines change. Other cache replacement policies are also within the scope of the present disclosure.

In some example embodiments, the video prefetcher 470 is configured to download HLS segments for each video. The video prefetcher 470 receives an authenticated asset URL from the video download manager 450 and downloads it from the CDN 480. The video prefetcher 470 may then pass this information back to the video download manager 450. The quality of the downloaded segment may be determined by the current network conditions. This information may be passed to the video prefetcher 470 by the video download manager 450. In some example embodiments, the video prefetcher 470 downloads one segment per video and each segment is approximately 6 seconds in duration. However, other download amounts, durations, and configurations are also within the scope of the present disclosure. The video prefetcher 470 may use a networking library to download video segments, using a background thread.

In some example embodiments, the video cache 460 is configured to write and delete video assets from disk, as well as maintain a file containing a map of downloads using JSON. There may be a limit on the total size of the video cache 460. For example, the video cache 460 may have a limit of 20 MB. However, other limit sizes for the video cache 460 are also within the scope of the present disclosure. The video cache 460 may define an eviction time for deleting cached assets on disk. For example, the video cache 460 may enforce a policy that it will not store a video for more than 24 hours. However, other eviction times for the video cache 460 are also within the scope of the present disclosure.

In some example embodiments, the video server 440 is configured to serve video the video player 430. In order to use the video server 440 instead of having the video player 430 load video directly from the CDN 480, the video server 440 is used as a resource loader by changing the scheme of the URLs from 'https' to a custom URL. An instance of the video server 440 may be assigned to a resource loader property by a library of the video player 430.

Figure 5:
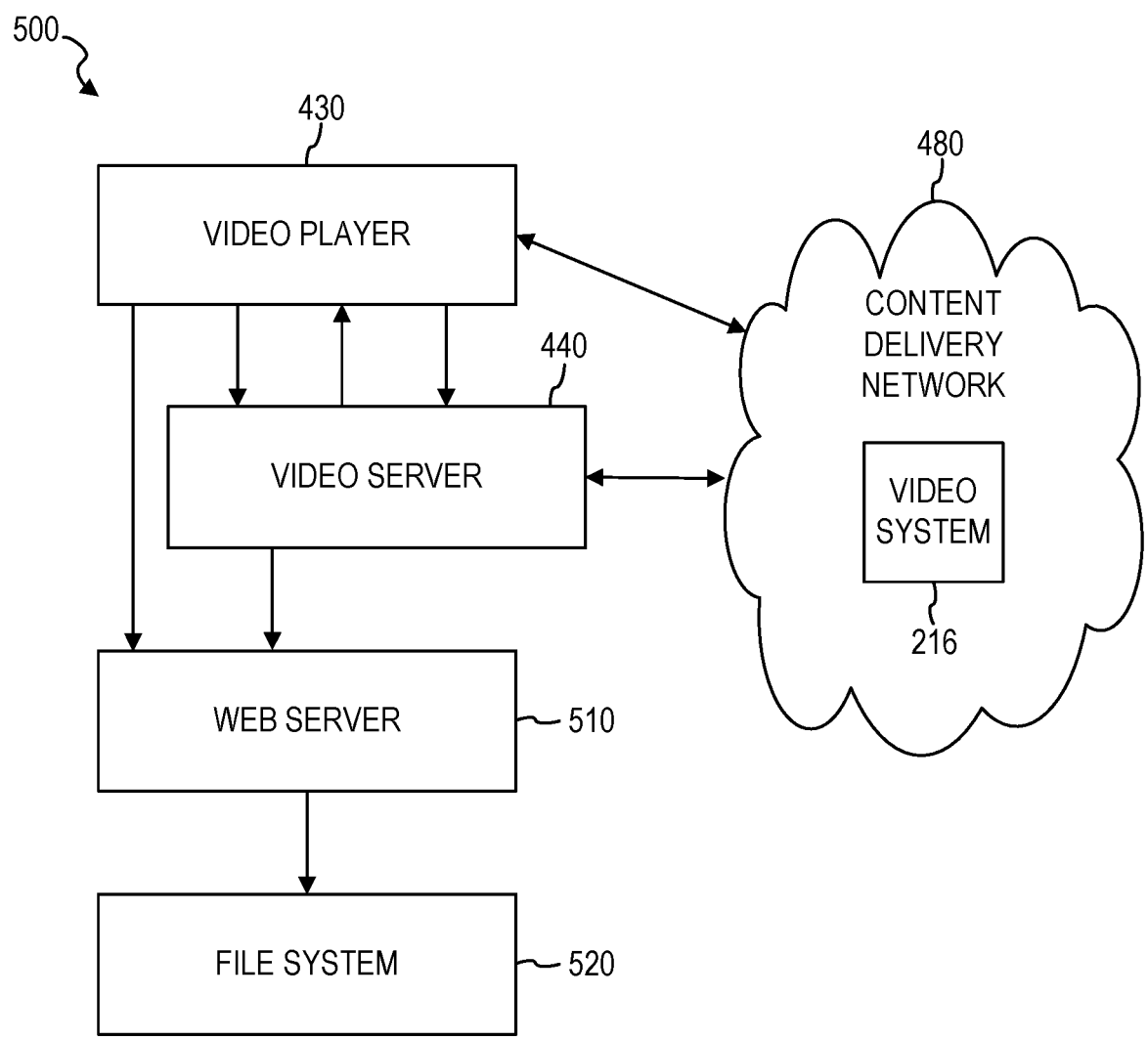
FIG. 5 illustrates a flow for a video server, in accordance with an example embodiment.

FIG. 5 illustrates a flow 500 for the video server 440, in accordance with an example embodiment. In the flow 500, once the video player 430 obtains the playlist URL, the video player 430 passes the playlist along to the video server 440, which acts as a resource loader, to help in loading the video. At this point, the video server 440 replaces the custom URL scheme with 'https' and loads the contents of the M3U8 playlist. Before returning this data back to video player 430, the video server 440 replaces the URL scheme of the first segment from 'https' to the custom URL and keeps the rest of the URLs untouched. In order to play the first segment of the video, the video player 430 again looks towards the video server 440 to provide it with this data. The video server 440 redirects the video player 430 to an internal web server 510, which serves the downloaded segment from a disk of a file system 520 over HTTP. The video player 430 may fetch the remaining video segments from the network 480, since they are pre-pended with the 'http' scheme.

Figure 6:
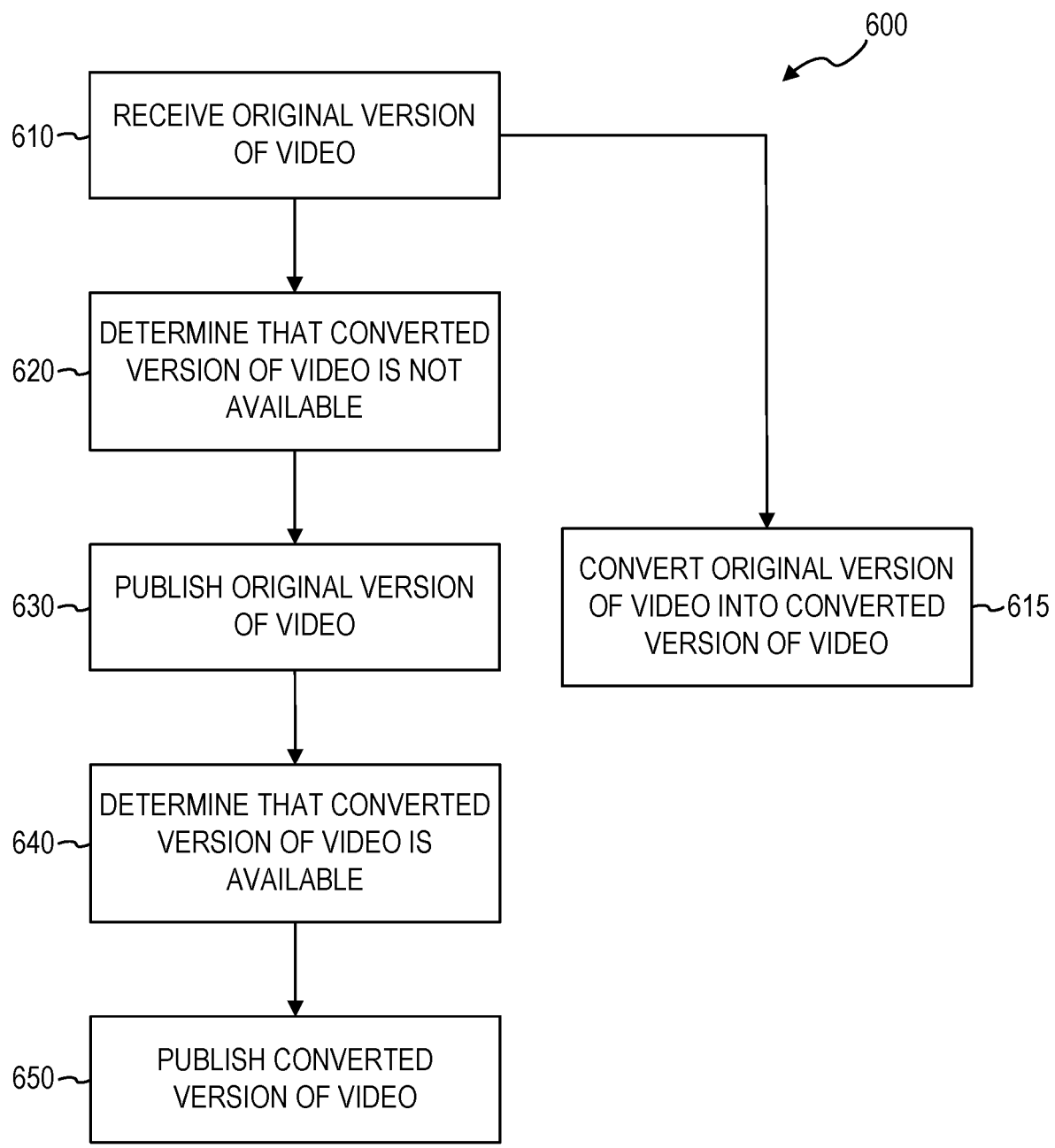
FIG. 6 is a flowchart illustrating a method of asynchronous processing and publishing of video, in accordance with an example embodiment.

FIG. 6 is a flowchart illustrating a method 600 of asynchronous processing and publishing of video, in accordance with an example embodiment. The method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the video system 216 of FIGS. 2-3, or any combination of one or more of its modules (e.g., the processing module 310, the publishing module 320), as described above.

At operation 610, the video system 216 receives an original version of a video from a first computing device of a first user of an online service. In some example embodiments, the original version of the video is received in association with a request to post the video for access by other users of the online service. For example, the first user may select one or more user interface elements on the first computing device in order to select the video (e.g., from a library of videos on the first computing device) and to trigger the upload of the selected video to the video system 216 for sharing with the other users.

At operation 615, the video system 216 converts the original version of the video into a converted version of the video. In some example embodiments, the original version of the video comprises a first video file format, the converted version of the video comprises a second video file format that is generated based on a conversion of the video in the first video file format to the video in the second video file format, such as by transcoding. For example, the video system 216 may convert the video from a first video file format of MP4 to a second video file format of HLS. Other video file formats are also within the scope of the present disclosure.

In some example embodiments, the conversion of the video from the first video file format of the original version of the video to the second video file format of the converted version of the video is not performed or completed immediately. Rather, there may be latency in the conversion process. As a result of this latency, the converted version of the video may not be initially available for online publishing immediately following the upload of the original version of the video by the first user. For example, a high volume in videos that have been uploaded by users for online publishing may result in a backlog in the conversion of those videos. Additionally, the duration of the videos may also add to the backlog and delay in conversion. Furthermore, in situations where conversion operations are performed sporadically or otherwise not performed continuously, the original version of the video may be received during a downtime period for the conversion process.

At a certain point after the original version of the video is uploaded and received at operation 610, the video system 216 attempts to publish the video. However, since the converted version of the video might not be available yet (e.g., the video may not yet be converted from the first video file format into the second video file format), the video system 216 may base the publishing of the video on whether or not the converted version is available.

At operation 620, the video system 216 determines that a converted version of the video is not available at a first point in time after the original version of the video has been received at operation 610. In some example embodiments, the video system 216 makes this determination based on information stored in the database(s) 330. For example, the database(s) 330 may store an indication of whether or not the converted version of the video is available or some other indication of which version(s) of the video are available in association with a record of the video, and the video system 216 may access the indication(s) stored in the database(s) 330 in order to make the determination at operation 620.

At operation 630, the video system 216 publishes the original version of the video on the online service in response to, or otherwise based on, the request to post the video and the determination, at operation 620, that the converted version of the video is not available. In some example embodiments, the publishing of the original version of the video is configured to enable other computing devices different from the first computing device to access and view the original version of the video via the online service. For example, the publishing of the original version of the video may be configured to enable the other computing devices to prefetch and play the original version of the video via the online service.

In some example embodiments, the publishing of the original version of the video is configured to restrict access to the original version of the video to only a particular subset of users of the online service. For example, access to the original version of the video may be restricted to only users that have a first degree connection with the first user. Other types of restrictions on access to the original version of the video are also within the scope of the present disclosure.

In some example embodiments, the publishing of the original version of the video at operation 630 is conditioned upon one or more other determinations as well. For example, operation 630 may comprises determining whether or not a duration of the original version of the video satisfies a minimum duration threshold value (e.g., whether the duration of the original version of the video is equal to or greater than 5 seconds), and the publishing of the original version of the video may be conditioned on a determination that the duration of the original version of the video satisfies the minimum duration threshold value. In another example, operation 630 may comprise determining, using a virus detection algorithm, whether or not the original version of the video has a virus, and the publishing of the original version of the video may be conditioned on a determination that the original version of the video does not have a virus.

At operation 640, the video system 216 determines that the converted version of the video is available at a second point in time subsequent to the first point in time of the determination at operation 620. In some example embodiments, the video system 216 makes this determination based on information stored in the database(s) 330. For example, the database(s) 330 may store an indication of whether or not the converted version of the video is available or some other indication of which version(s) of the video are available in association with a record of the video, and the video system 216 may access the indication(s) stored in the database(s) 330 in order to make the determination at operation 640.

At operation 650, the video system 216 publishes the converted version of the video on the online service in response to, or otherwise based on, the determination, at operation 640, that the converted version of the video is available. In some example embodiments, the publishing of the converted version of the video is configured to enable the other computing devices to access and view the converted version of the video via the online service. For example, the publishing of the converted version of the video may be configured to enable the other computing devices to prefetch and play the converted version of the video via the online service. In some example embodiments, the publishing of the converted version of the video, at operation 650, replaces the original version of the video from access by the other computing devices of the other users with the converted version of the video.

It is contemplated that any of the other features described within the present disclosure can be incorporated into the method 600.

Figure 7:
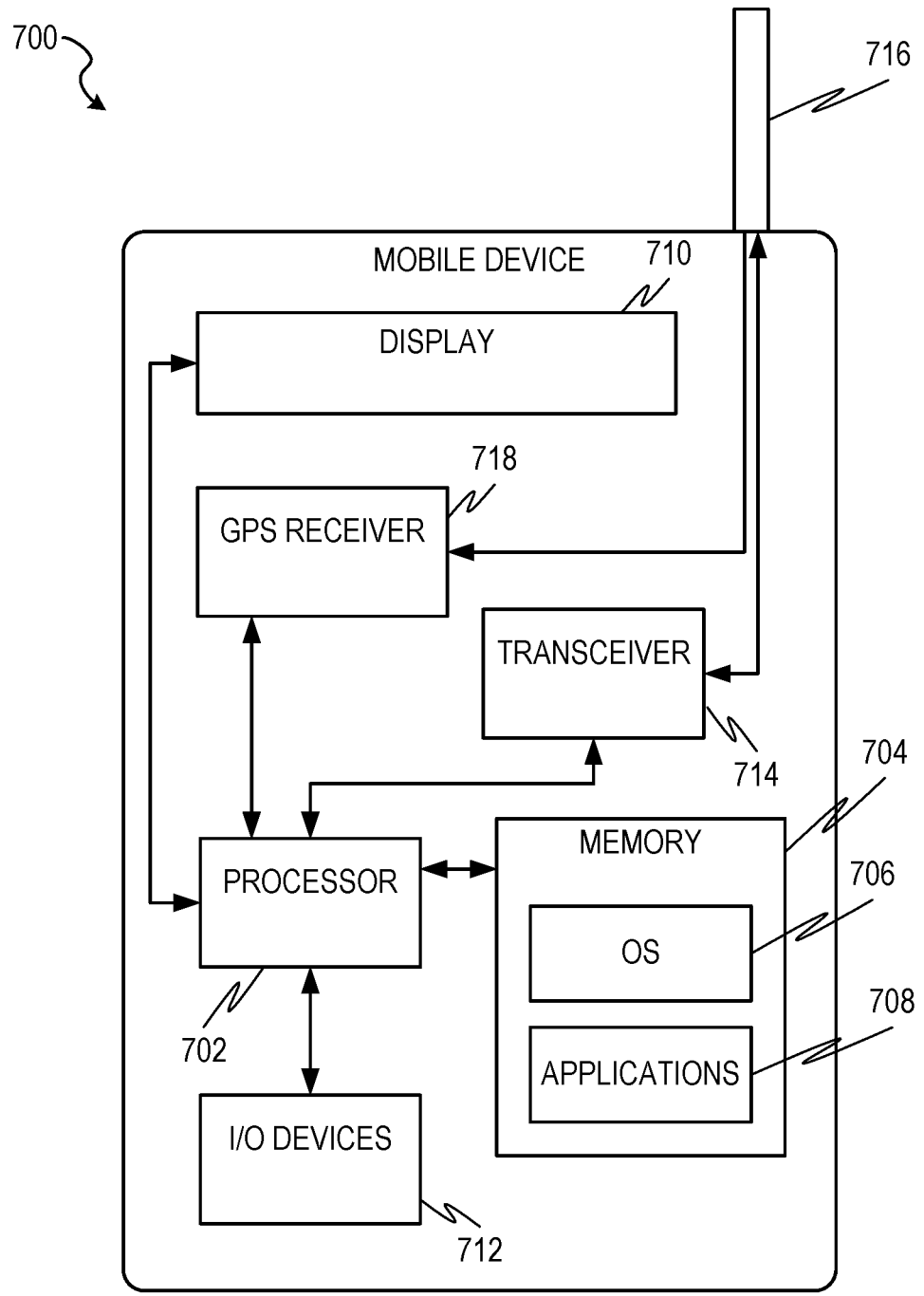
FIG. 7 is a block diagram illustrating a mobile device, in accordance with some example embodiments.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as application programs 708, such as a mobile location-enabled application that can provide location-based services (LBSs) to a user. The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
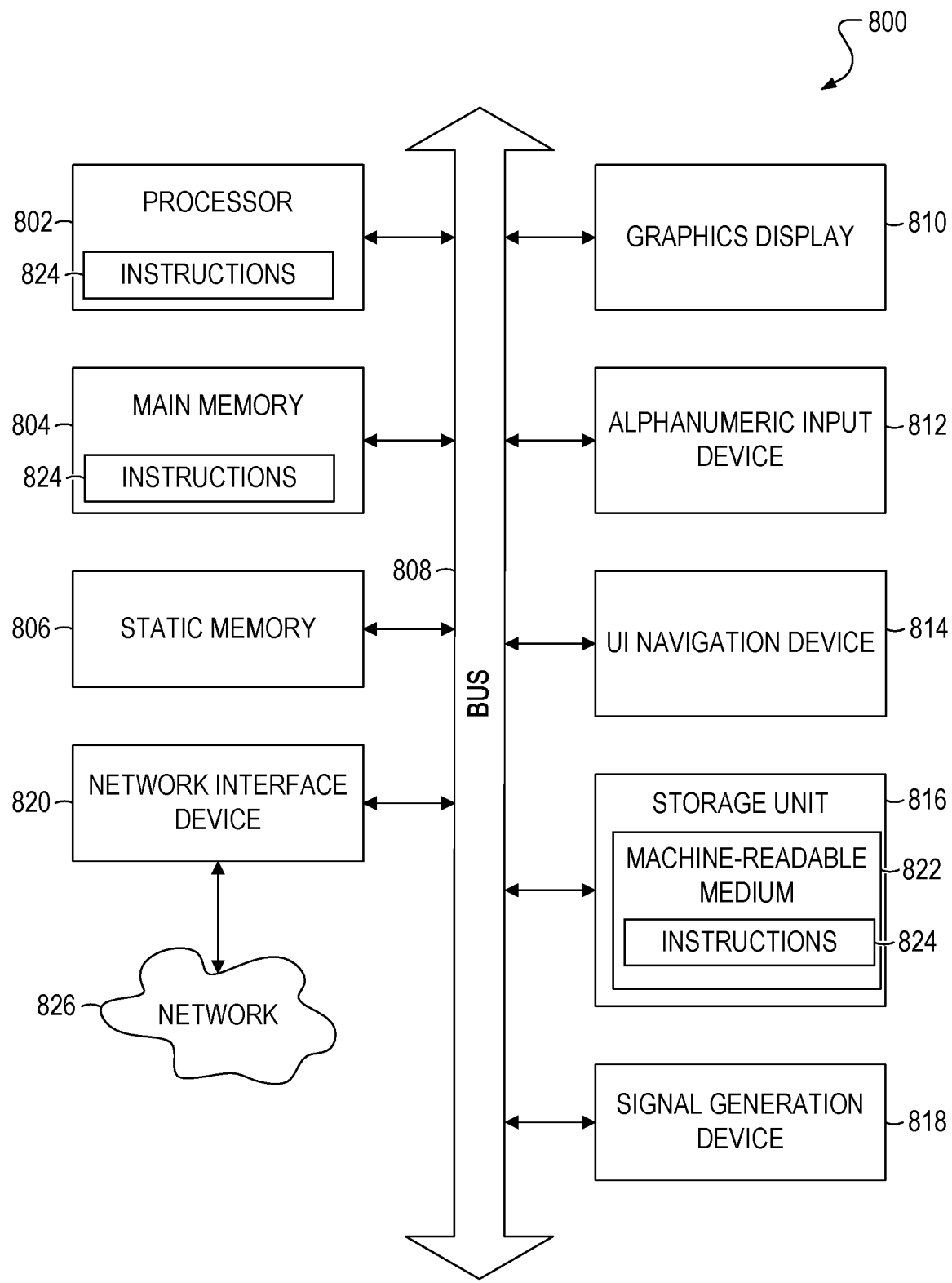
FIG. 8 is a block diagram of an example computer system on which methodologies described herein may be executed, in accordance with an example embodiment.

FIG. 8 is a block diagram of an example computer system 800 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a graphics display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation device 814 (e.g., a mouse), a storage unit 816, a signal generation device 818 (e.g., a speaker) and a network interface device 820.

The storage unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions (e.g., instructions 824) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following paragraphs provide example embodiments.

Example 1 includes a computer-implemented method comprising: receiving, by a computer system having a memory and at least one hardware processor, an original version of a video from a first computing device of a first user of an online service, the original version of the video comprising a first video file format, and the original version of the video being received in association with a request to post the video for access by other users of the online service; determining, by the computer system, that a converted version of the video is not available at a first point in time, the converted version comprising a second video file format generated based on a conversion from the first video file format; publishing, by the computer system, the original version of the video on the online service based on the request to post the video and on the determining that the converted version of the video is not available, the publishing of the original version of the video being configured to enable other computing devices different from the first computing device to access the original version of the video via the online service; determining, by the computer system, that the converted version of the video is available at a second point in time subsequent to the first point in time; and publishing, by the computer system, the converted version of the video on the online service based on the determining that the converted version of the video is available, the publishing of the converted version of the video being configured to enable the other computing devices to access the converted version of the video via the online service.

Example 2 includes the computer-implemented method of example 1, wherein the second video file format is an HLS format.

Example 3 includes the computer-implemented method of example 2, wherein the first video file format is an MP4 format.

Example 4 includes the computer-implemented method of any one of examples 1 to 3, wherein: the publishing of the original version of the video is configured to enable the other computing devices to prefetch the original version of the video via the online service; and the publishing of the converted version of the video is configured to enable the other computing devices to prefetch the converted version of the video via the online service.

Example 5 includes the computer-implemented method of any one of examples 1 to 4, wherein the publishing of the original version of the video is configured to restrict access to the original version of the video to only a particular subset of users of the online service.

Example 6 includes the computer-implemented method of any one of examples 1 to 5, wherein the particular subset of users of the online service comprises users that have a first degree connection with the first user.

Example 7 includes the computer-implemented method of any one of examples 1 to 6, further comprising: determining, by the computer system, that a duration of the original version of the video satisfies a minimum duration threshold value, wherein the publishing of the original version of the video is based on the determining that the duration of the original version of the video satisfies the minimum duration threshold value.

Example 8 includes the computer-implemented method of any one of examples 1 to 7, further comprising: determining, by the computer system, that the original version of the video does not have a virus using a virus detection algorithm, wherein the publishing of the original version of the video is based on the determining that the original version of the video does not have a virus.

Example 9 includes the computer-implemented method of any one of examples 1 to 8, wherein the other computing devices comprise mobile devices.

10. A system comprising:
at least one processor; and
a non-transitory computer-readable medium storing executable instructions that, when executed, cause the at least one processor to perform the method of any one of examples 1 to 9.

11. A non-transitory machine-readable storage medium, tangibly embodying a set of instructions that, when executed by at least one processor, causes the at least one processor to perform the method of any one of examples 1 to 9.

12. A machine-readable medium carrying a set of instructions that, when executed by at least one processor, causes the at least one processor to carry out the method of any one of examples 1 to 9.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

receiving, by a computer system having a memory and at least one hardware processor, an original version of a video from a first computing device of a first user of an online service, the original version of the video comprising a first video file format, and the original version of the video being received in association with a request to post the video for access by other users of the online service;

determining, by the computer system, that a converted version of the video is not available at a first point in time, the converted version comprising a second video file format generated based on a conversion from the first video file format;

publishing, by the computer system, the original version of the video on the online service based on the request to post the video, on a determination that the original version of the video does not have a virus, and on the determining that the converted version of the video is not available, the publishing of the original version of the video being configured to enable other computing devices different from the first computing device to access the original version of the video via the online service, the publishing of the original version of the video is configured to restrict access to the original version of the video to only a particular subset of users of the online service, each user in the particular subset of users of the online service having a corresponding first degree connection with the first user in which either one of the user in the particular subset of users and the first user has accepted an invitation to connect from the other one of the user in the particular subset of users and the first user;

determining, by the computer system, that the converted version of the video is available at a second point in time subsequent to the first point in time; and publishing, by the computer system, the converted version of the video on the online service based on the determining that the converted version of the video is available, the publishing of the converted version of the video being configured to enable the other computing devices to access the converted version of the video via the online service.

2. The computer-implemented method of claim 1, wherein the second video file format is an HLS format.

3. The computer-implemented method of claim 1, wherein the first video file format is an MP4 format.

4. The computer-implemented method of claim 1, wherein:

the publishing of the original version of the video is configured to enable the other computing devices to prefetch the original version of the video via the online service; and the publishing of the converted version of the video is configured to enable the other computing devices to prefetch the converted version of the video via the online service.

5. The computer-implemented method of claim 1, further comprising:

determining, by the computer system, that a duration of the original version of the video satisfies a minimum duration threshold value, wherein the publishing of the original version of the video is based on the determining that the duration of the original version of the video satisfies the minimum duration threshold value.

6. The computer-implemented method of claim 1, further comprising:

determining, by the computer system, that the original version of the video does not have the virus using a virus detection algorithm.

7. The computer-implemented method of claim 1, wherein the other computing devices comprise mobile devices.

8. The computer-implemented method of claim 1, wherein the publishing of the original version of the video on the online service comprises publishing the original version of the video as a streaming video.

9. The computer-implemented method of claim 1, wherein the publishing of the converted version of the video on the online service comprises publishing the converted version of the video as a streaming video.

10. The computer-implemented method of claim 1, wherein the publishing of the original version of the video on the online service comprises publishing the original version of the video in a personalized online data feed of each user of the particular subset of users of the online service.

11. The computer-implemented method of claim 1, wherein the publishing of the converted version of the video on the online service comprises publishing the original version of the video in a personalized online data feed of one or more users of the online service.

12. A system comprising:

at least one hardware processor; and a non-transitory machine-readable medium embodying a set of instructions that, when executed by the at least one hardware processor, cause the at least one processor to perform operations, the operations comprising:

receiving an original version of a video from a first computing device of a first user of an online service, the original version of the video comprising a first video file format, and the original version of the video being received in association with a request to post the video for access by other users of the online service;

determining that a converted version of the video is not available at a first point in time, the converted version comprising a second video file format generated based on a conversion from the first video file format;

publishing the original version of the video on the online service based on the request to post the video, on a determination that the original version of the video does not have a virus, and on the determining that the converted version of the video is not available, the publishing of the original version of the video being configured to enable other computing devices different from the first computing device to access the original version of the video via the online service, the publishing of the original version of the video is configured to restrict access to the original version of the video to only a particular subset of users of the online service, each user in the particular subset of users of the online service having a corresponding first degree connection with the first user in which either one of the user in the particular subset of users and the first user has accepted an invitation to connect from the other one of the user in the particular subset of users and the first user;

determining that the converted version of the video is available at a second point in time subsequent to the first point in time; and publishing the converted version of the video on the online service based on the determining that the converted version of the video is available, the publishing of the converted version of the video being configured to enable the other computing devices to access the converted version of the video via the online service.

13. The system of claim 12, wherein the second video file format is an HLS format.

14. The system of claim 12, wherein the first video file format is an MP4 format.

15. The system of claim 12, wherein:
the publishing of the original version of the video is configured to enable the other computing devices to prefetch the original version of the video via the online service; and
the publishing of the converted version of the video is configured to enable the other computing devices to prefetch the converted version of the video via the online service.

16. The system of claim 12, wherein the operations further comprise:
determining that a duration of the original version of the video satisfies a minimum duration threshold value,
wherein the publishing of the original version of the video is based on the determining that the duration of the original version of the video satisfies the minimum duration threshold value.

17. The system of claim 12, wherein the operations further comprise:
determining that the original version of the video does not have the virus using a virus detection algorithm.

18. The system of claim 12, wherein the other computing devices comprise mobile devices.

19. A non-transitory machine-readable medium embodying a set of instructions that, when executed by at least one hardware processor, cause the processor to perform operations, the operations comprising:

receiving an original version of a video from a first computing device of a first user of an online service, the original version of the video comprising a first video file format, and the original version of the video being received in association with a request to post the video for access by other users of the online service;

determining that a converted version of the video is not available at a first point in time, the converted version comprising a second video file format generated based on a conversion from the first video file format;

publishing the original version of the video on the online service based on the request to post the video, on a determination that the original version of the video does not have a virus, and on the determining that the converted version of the video is not available, the publishing of the original version of the video being configured to enable other computing devices different from the first computing device to access the original version of the video via the online service, the publishing of the original version of the video is configured to restrict access to the original version of the video to only a particular subset of users of the online service, each user in the particular subset of users of the online service having a corresponding first degree connection with the first user in which either one of the user in the particular subset of users and the first user has accepted an invitation to connect from the other one of the user in the particular subset of users and the first user;

determining that the converted version of the video is available at a second point in time subsequent to the first point in time; and publishing the converted version of the video on the online service based on the determining that the converted version of the video is available, the publishing of the converted version of the video being configured to enable the other computing devices to access the converted version of the video via the online service.

20. The non-transitory machine-readable medium of claim 19, wherein the second video file format is an HLS format.

* * * * *